W. F. CONRAN.
PRESSURE REGULATING VALVE.
APPLICATION FILED DEC. 28, 1916.

1,344,383.

Patented June 22, 1920.
2 SHEETS—SHEET 1.

WITNESSES:

INVENTOR.
William F. Conran
BY
ATTORNEY.

W. F. CONRAN.
PRESSURE REGULATING VALVE.
APPLICATION FILED DEC. 28, 1916.
1,344,383. Patented June 22, 1920.
2 SHEETS—SHEET 2.
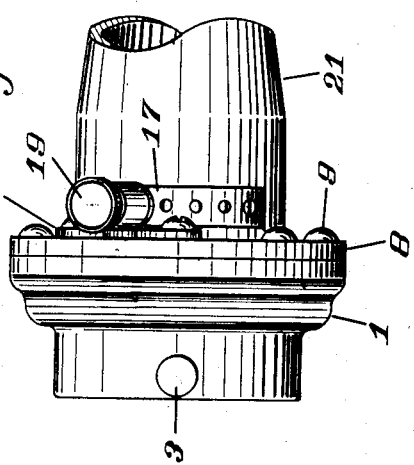
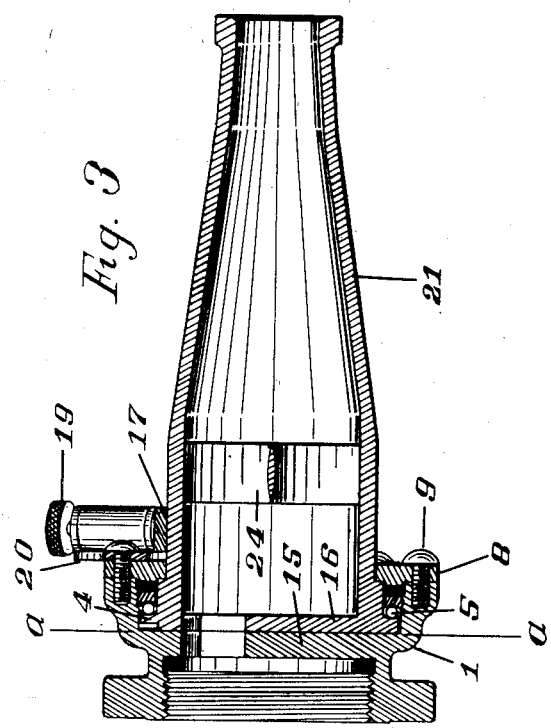
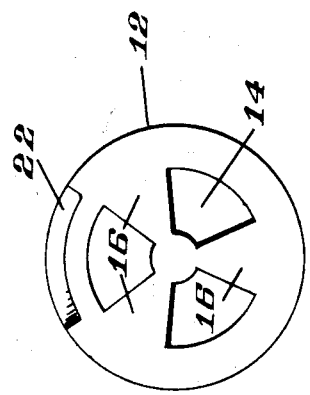
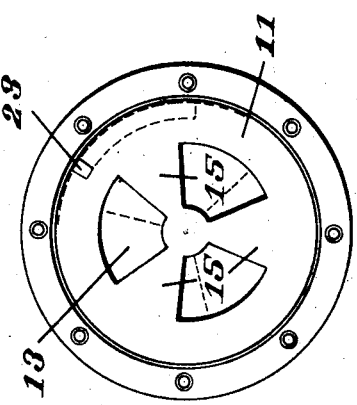
WITNESSES:
INVENTOR.
William F. Conran
BY
ATTORNEY.

UNITED STATES PATENT OFFICE.

WILLIAM F. CONRAN, OF BROOKLYN, NEW YORK.

PRESSURE-REGULATING VALVE.

1,344,383.  Specification of Letters Patent.  Patented June 22, 1920.

Application filed December 28, 1916. Serial No. 139,286.

*To all whom it may concern:*

Be it known that I, WILLIAM F. CONRAN, a citizen of the United States of America, residing in the borough of Brooklyn, of the city of New York, in the county of Kings and State of New York, have invented a certain new and useful Pressure-Regulating Valve, of which the following is a specification.

The main object of my invention is to provide a device for counteracting or neutralizing the back-pressure resulting from a jet of water issuing from a nozzle, and my invention is more particularly designed for use with hose-nozzles. A second object of my invention is to provide a simple and efficient device for controlling the water pressure at or near the point of discharge so as not to affect the pressure on the entire line of piping or hose or at other points of discharge.

Figure 2:
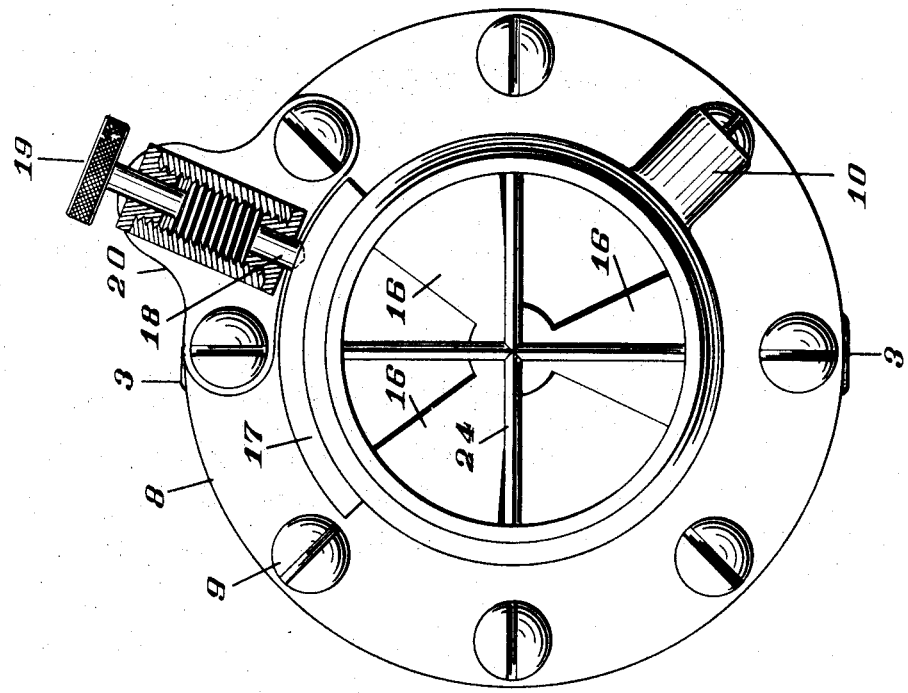
Figure 1:
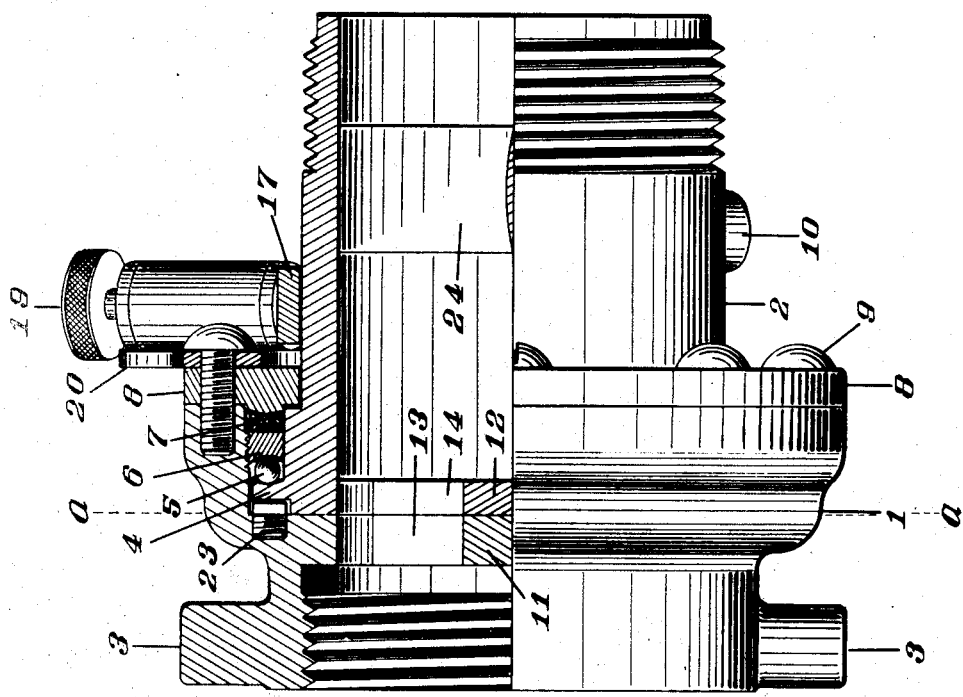

In the accompanying drawings in which I have illustrated my invention as applied to a hose-nozzle, Figure 1 is a half central sectional view; Fig. 2, an end view and part sectional view; Fig. 3, a longitudinal sectional view of the back-pressure neutralizing device combined with a nozzle; Fig. 4, an elevation of the device of Fig. 3, with the end of the nozzle broken off; and Figs. 5 and 6 are plan views on the line *a—a* of Figs. 1 and 3.

Referring to the drawings, and more particularly to Figs. 1 and 2, it will be observed that the device is composed of two tubular body portions 1 and 2. Member 1 is provided with an internal screw-thread to receive the male member of the ordinary hose-coupling or for attachment to a standpipe or other water supply system, and this member is also provided with a pair of studs 3 to receive the ordinary spanner-wrench used on hose-couplings. The opposite end of member 1 has an annular recess in which member 2 is seated, and this member is provided with an external screw-thread to receive the female member of the ordinary hose-coupling or a nozzle. The inner end of member 2 is provided with a flange 4 which closely fits within the annular recess in body 1, and this flange forms one member of a ball-race; one ball being shown at 5, and the other member of the race is a screw-threaded ring 6. This ring is screwed into body 1 to a point which will give a close sliding contact between parts 1 and 2. Above ring 6 is a layer of packing material 7 held in place by a packing-ring 8 which is secured to body 1 by screws 9.

Member 2 is capable of rotary adjustment within body 1 for the purpose hereinafter stated, and this adjustment may be obtained by hand, but preferably the engagement of members 1 and 2 is made so close to avoid leakage that it is necessary to move member 2 by means of a tool. For this purpose a stud 10 is provided so that the same spanner-wrench used with studs 3 may be used to rotate member 2, although any other means may be provided for this purpose.

The members 1 and 2 are provided, respectively, with perforated partitions 11 and 12, the contacting faces of which are preferably ground to make a close and smooth fit. The perforations 13 and 14 may be of any desired shape and number, but are preferably of the shape and number shown, and the perforations in each partition are preferably of the same shape and size. The purpose of the rotary adjustability of member 2 is to permit variation in the position of openings 13 and 14 relative to each other, or in other words, the relative positions of webs 15 and 16 may be changed to vary the dimensions of the openings. This is shown in Fig. 5 by the dotted lines; the position indicated being that of greatest wall area exposed to the stream as limited by the length of groove 22 and stop-pin 23. To insure the parts being retained at the adjusted position and also to serve as an indicator of the size of the perforations, I provide an index and locking device which consists in the form shown of a curved plate 17 secured to member 2, and a screw-locking-pin 18 having a milled head 19 or other means for adjusting same. This pin registers with a series of holes in plate 17, the number of holes depending of course on the number of adjustments desired. The screw-pin works in a cylindrical screw-threaded sleeve having end bearing plugs and is carried by a plate 20 secured to member 1 by two of the packing-ring-screws 9.

The main function of partitions 11 and 12 is to offer resistance to the flow of the water and the area of webs 15 and 16 is such that the forward pressure created on the webs and tending to move the entire device and the attached hose and nozzle forward will counteract or neutralize the back-pressure created by the jet of water issuing from the nozzle. The neutralizing effect may be modified by varying the size of the openings and thus varying the area of the webs or partition exposed to the stream so as to offer greater or less resistance to the flow of water as the pressure on the line is increased or decreased which would cause an increase or decrease in the back-pressure. In practice the size of openings 13 and 14 will be such that the total area will be considerably greater than the cross-sectional area of the opening of the largest nozzle used with the device so as not to affect the volume of discharge; and the size of the webs will be such that when openings 13 and 14 are fully open the total area of the webs will be sufficient to give the necessary neutralizing effect for the water pressures ordinarily employed. Thus when it becomes necessary to increase the pressure of the water supply for any reason, the device may be quickly adjusted at the nozzle to neutralize the increased back-pressure. Incidentally the adjustability of partitions 11 and 12 also enables the operator at the nozzle to regulate the nozzle-pressure and the quantity of water discharged through the nozzle, thus securing the desired pressure at the point of discharge and without affecting the pressure on the line and at other points of discharge.

Referring now to Figs. 3 and 4 of the drawings, it will be noted that the parts are identical with those of Figs. 1 and 2, except that instead of member 2 being screw-threaded to receive a nozzle, that part is formed into a nozzle 21. In this form I have not shown the stud 10 for a tool to turn the nozzle for the reason that the nozzle itself affords a sufficient gripping surface for the operator to turn it by hand, although a similar stud or other means may be provided. In both arrangements I have shown cross-webs 24 in member 2 and nozzle 21. The number and width of these webs may be varied and the purpose is to break any twist or swirl in the water caused by the stream coming through the openings in partitions 11 and 12, and thereby insure a solid stream issuing from the nozzle. The ball thrust-bearing for member 2 and nozzle 21 is not essential to the device as shown since the amount of rotation of members 2 and 21 within member 1 will be very slight and not frequent in practice.

What I claim is:

1. A device for controlling the flow of water in a pipe-line, comprising inlet and outlet members arranged to rotate relatively to each other to regulate the flow and having a straight waterway therethrough, the inlet member having an internal screw thread for attachment to a pipe-line, a perforated diaphragm or valve disk fixed therein, and said member having an enlarged annular part forming a housing, the outlet member seated within said housing and having at its inner or seated end a similarly perforated diaphragm or valve disk fixed thereon and which disk is arranged to make close sliding contact with the first-named valve disk, a retaining ring within the bore of said housing and serving to retain said outlet member in position, a packing material above said ring, a packing ring bolted to said housing, and a locking device mounted on said packing-ring adapted to engage a coöperating locking and indicating member on said outlet member, substantially as set forth.

2. A device for controlling the flow of water in a pipe-line, comprising inlet member 1 and outlet member 2 arranged to rotate relatively to each other to regulate the flow and having a straight waterway therethrough, said inlet member being provided with an internal screw thread at one end for attachment to a pipe-line, and an annular enlargement at the other end forming a housing for member 2, and a perforated diaphragm or valve disk 11 fixed in the waterway of said member, said outlet member 2 having a similarly perforated diaphragm or valve disk 12 fixed at the inner end thereof and seated upon the inlet valve disk, the relation of said valve disks being such that the incoming pressure does not increase the frictional contact thereof, a flange 4 on the exterior inner end of member 2 forming one side of a ball-race, a ring 6 screwed into the housing of member 1 and forming the other side of said ball-race, a packing material above said ring, a packing-ring bolted to said housing and whereby the packing material is compressed between it and ring 6 and forced against the wall of member 2, means on member 2 for rotating same to vary the opening through the valve disks, a plurality of short vanes extending across the waterway in the outlet member, and an indicating and locking device, substantially as set forth.

This specification signed and witnessed this 4th day of December, 1916.

WILLIAM F. CONRAN.

Witnesses:
HAROLD H. PELZER,
CHAS. REZNICEK.